United States Patent [19]

Cavalli, deceased et al.

[11] Patent Number: 4,784,050
[45] Date of Patent: Nov. 15, 1988

[54] APPARATUS FOR PREPARING ESPRESSO COFFEE IN A HOUSEHOLD ENVIRONMENT

[76] Inventors: Alfredo Cavalli, deceased, late of Pessano con Bornago, Italy; by Cesarina Filippi, heir; by Massimo F. Cavalli, heir; by Silvia Cavalli, heir, all of Via Galileo Galilei, 9, 20060 Pessano con Bornago, Milan, Italy

[21] Appl. No.: 800,234

[22] Filed: Nov. 21, 1985

[30] Foreign Application Priority Data

Nov. 21, 1984 [IT] Italy .................................. 23846[U]

[51] Int. Cl.⁴ ............................................ H47J 31/00
[52] U.S. Cl. .................................. 99/289 R; 99/285; 99/302 P
[58] Field of Search ............... 99/289 R, 295, 297, 99/285, 300, 302 P, 279; 426/433

[56] References Cited

U.S. PATENT DOCUMENTS

| | | | |
|---|---|---|---|
| 3,483,811 | 12/1969 | Heier | 99/289 |
| 3,496,861 | 2/1970 | Stahler | 99/289 |
| 3,573,860 | 4/1971 | Bentzman | 99/289 |
| 4,271,752 | 6/1981 | Valente | 99/289 R |

*Primary Examiner*—Robert W. Jenkins
*Attorney, Agent, or Firm*—Sughrue, Mion, Zinn, Macpeak, and Seas

[57] ABSTRACT

An apparatus for preparing "espresso" coffee in a household environment comprises a powder coffee metering dispenser assembly, a hot water dispenser assembly, an emptying device for the cup-like percolator movable along guide-forming means extending below said powder coffee metering dispenser assembly, said hot water dispenser assembly and said emptying device.

5 Claims, 4 Drawing Sheets

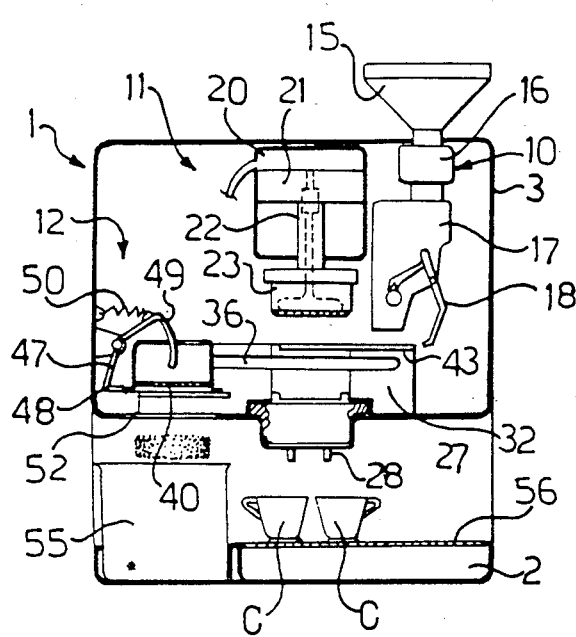
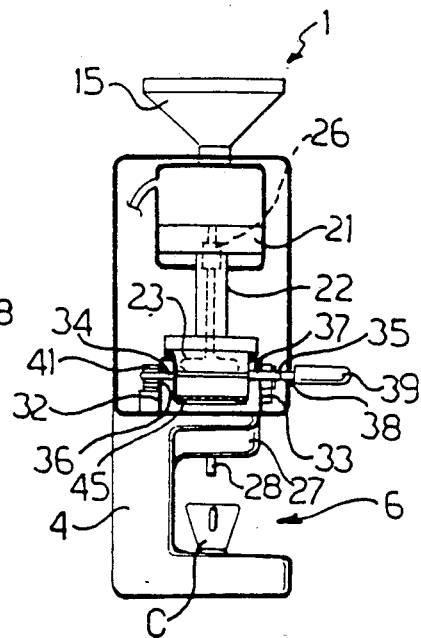
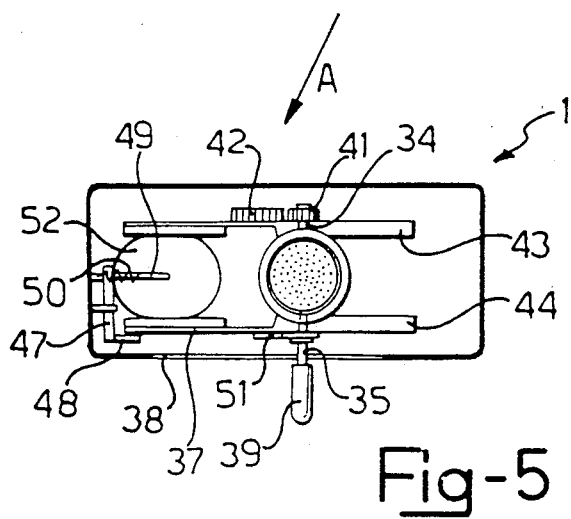

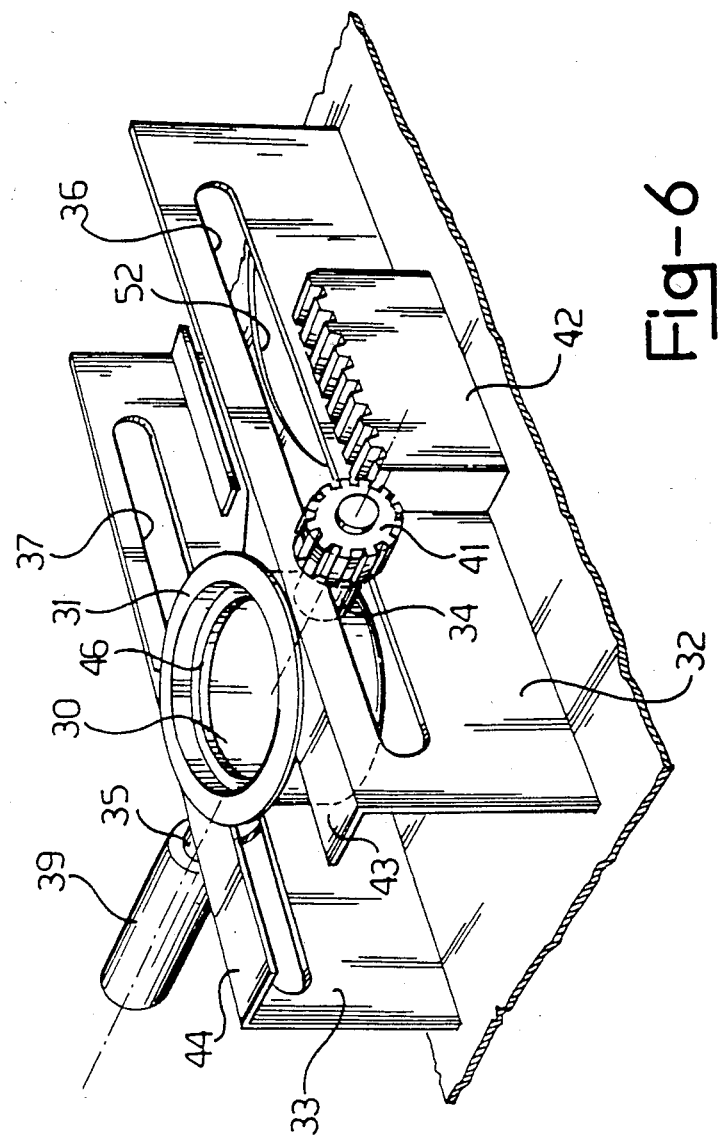

4,784,050

APPARATUS FOR PREPARING ESPRESSO COFFEE IN A HOUSEHOLD ENVIRONMENT

DESCRIPTION

The present invention relates to an apparatus for preparing espresso coffee in a household environment.

To prepare "espresso" coffee in a household environment, it has been necessary, heretofore, to fill a cup-like percolator with powder coffee, possibly and preferably by the use of a powder coffee metering/dispensing device. Thereupon, after applying an appropriate compression to the powder coffee with a specially provided pad, the cup-like percolator is brought to a hot water dispensing device of an "espresso" coffee maker. Once the "espresso" coffee is obtained, the cup-like percolator is removed from the machine and emptied manually of the now wet (cake) powder.

While the foregoing operations can be performed in a fairly quick and reliable manner, the need is felt, however, for a further simplification and expediting of the procedure. To meet this demand, so-called automatic apparatus have been proposed whose operation requires, however, the availability of soluble coffee which, albeit of good quality, cannot match the flavor of traditional "espresso" coffee as prepared from freshly ground coffee powder.

It is the primary object of the present invention to provide an apparatus for use in a household environment to prepare "espresso" coffee, which has such structural and functional characteristics as to afford an effective preparation of "espresso" coffee from powder coffee, while requiring a reduced course of action by the user.

This object is achieved, according to the invention, by an apparatus for the preparation of "espresso" coffee, characterized in that it comprises:

a load-bearing frame defining a base;

a powder coffee metering dispenser assembly carried on said frame in a position overlying said base;

a hot water dispenser assembly carried on said frame in a position flanking said metering assembly and overlying said base;

a guide-forming means, supported and extending in a position underlying said dispenser assemblies and overlying said base;

a cup-like percolator provided with a counterguide means in sliding engagement with said guide means, and with a handgrip for reciprocating said cup-like percolator along said guide means;

a device for emptying said cup-like percolator carried on said frame in a position adjacent to said guide means.

Further features and advantages will be more clearly understood from a detailed description of a preferred, but not limitative, embodiment of an apparatus for preparing "espresso" coffee according to the invention, given herein below with reference to the accompanying drawings, given herein merely by way of illustration and not of limitation.

In the drawings:

FIGS. 1, 2 and 3 show schematically, in crosssection and in elevation, an apparatus according to the invention, in various operating conditions thereof;

FIG. 4 is a sectional view taken along the line IV—IV of FIG. 2;

FIG. 5 is a sectional view taken along the line V—V of FIG. 2;

FIG. 6 is an enlarged scale perspective view of a detail in FIG. 5 as viewed in the direction A;

Figure 1:
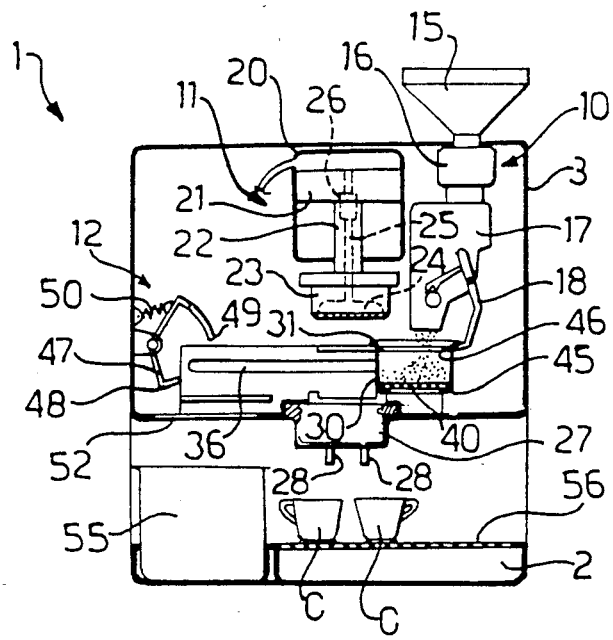
Figure 2:
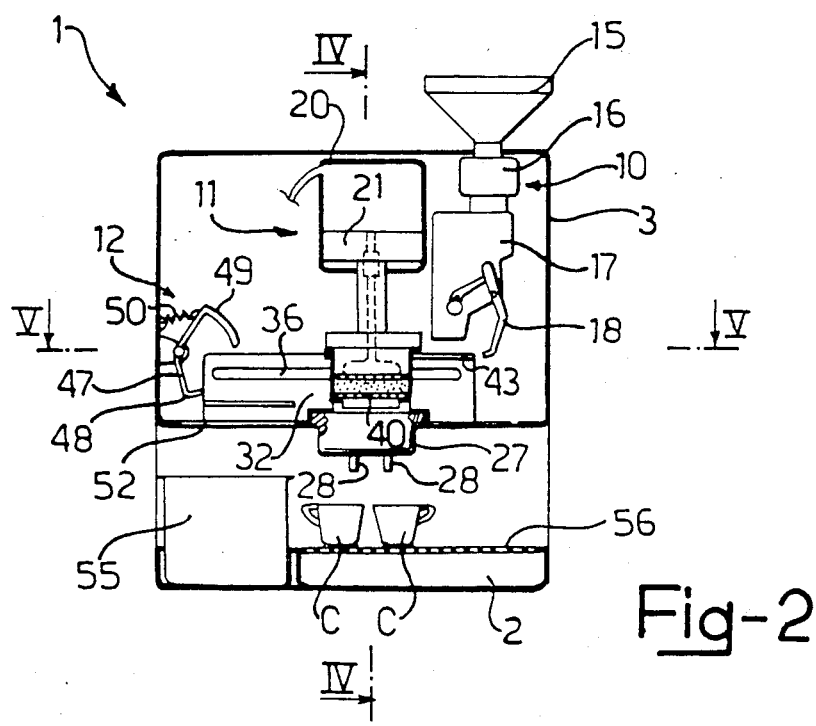
Figure 9:
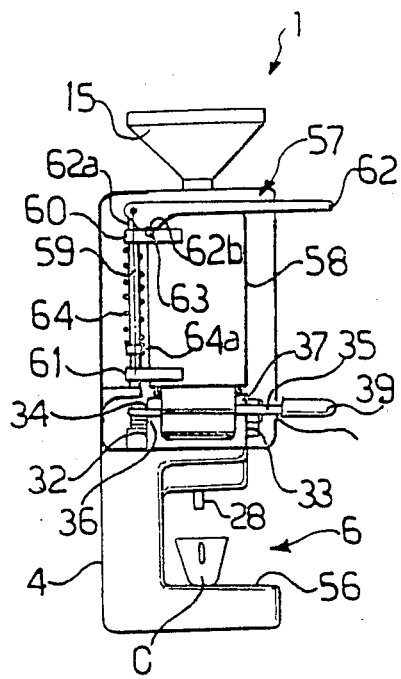
Figure 7:
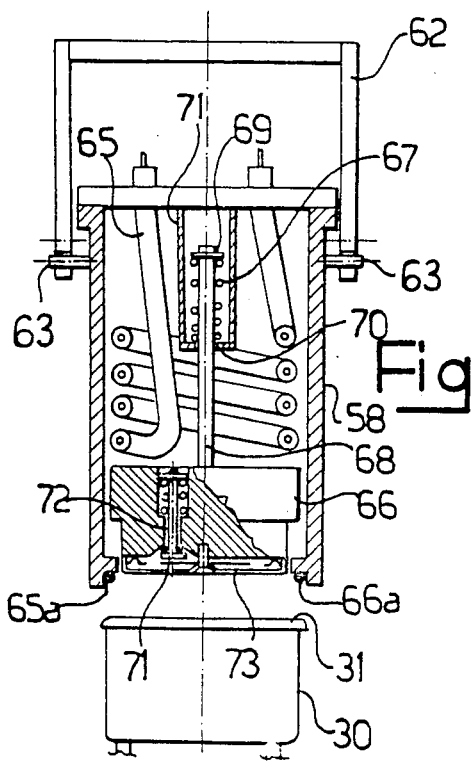
Figure 8:
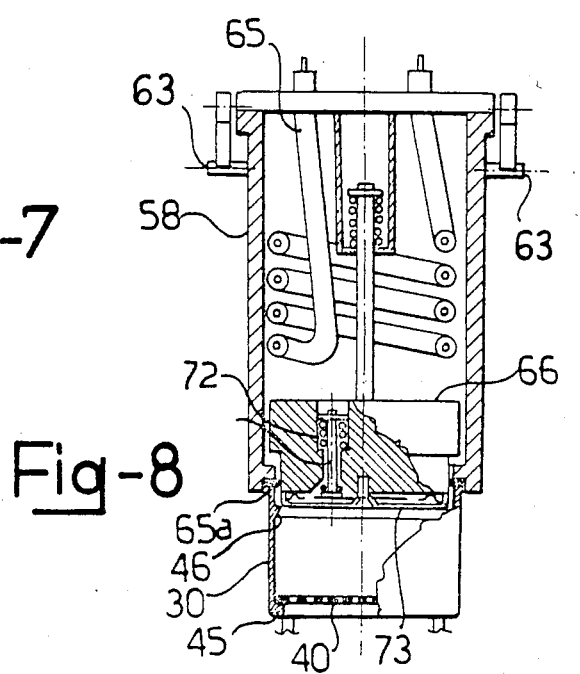

FIGS. 7 and 8 shown, in section, elevation and to an enlarged scale, a modified embodiment of a detail of the apparatus of FIG. 1, in different operating conditions thereof;

FIG. 9 is a side view showing schematically an apparatus according to the invention as incorporating the modified embodiment of FIGS. 7 and 8.

An apparatus, useful in a household environment for preparing "espresso" coffee from powder coffee, comprises a load-bearing frame composed of a box-type construction case 1, wherein a base 2 is formed which is overlaid by a body 3. The base 2 and body 3 overhand from the bottom wall 4 of said case 1 and form an open compartment 6 (FIG. 4) therebetween which is accessible by the user.

On the body 4, in a position overlying said base 2, there are supported a powder coffee metering dispenser assembly 10 and a hot water dispenser assembly 11, flanking each other.

The metering dispenser assembly 10 is of a conventional type, and accordingly, only shown diagramatically; it comprises a hopper 15 for loading bean coffee, a coffee grinder 16, a powder coffee container 17, and a metering mechanism (e.g. of the rotary segment type) of which only the operating handle 18 is depicted.

The hot water dispenser assembly 11 comprises a vertical axis cylinder 20 fed with hot water under pressure from conventional pumping members, not shown. Within the cylinder 20, a piston 21 is movable sealingly which has a rod 22 extending outwards from the cylinder 20 and being provided at its free end with a pad 23. The pad 23 is formed with multiple perforations 24 for hot water sprinkling, in communications with the cylinder 20 through a conduit 25 formed axially through the rod 22 and having a calibrated check valve 26.

A cup-like collector 27 is supported below the cylinder 20 and provided with a pair of coffee delivery spouts jutting out into the compartment 6.

At an intermediate location to the base 2 and dispenser assemblies 10, 11 just described, there guided movably, in manner to be explained, a cup-like percolator 30 for the powder coffee. The percolator 30 is provided with a perforated bottom cap 40 which is movable between two annular rims 45 and 46 formed in the cup-like percolator 30 at lower and upper locations thereon (FIG. 1). The cup-like percolator 30 is formed at the top with a projecting annular rim 31, and at diametrally opposed locations thereon two trunnions 34 and 35 are affixed which extend radially outwards. The trunnions 34 and 35 are engaged slidably and rotatably in respective slots 36 and 37, formed longitudinally through parallel walls 32 and 33 supported in mutually spaced apart relationship from the frame 1 at a location underlying the dispenser assemblies 10 and 11 described hereinabove.

The walls 32 and 33 with their respective slots 36 and 37 form guide and support means for said cup-like percolator 30, the trunnions 34 and 35 whereof constitute the guide counter-means.

The trunnion 35 extends externally of the body 4 through a slit 38 formed therein, and has a knob 39 mounted for idle rotation thereon, for its movements along the aforesaid guide means.

Externally of the wall 32 and at a side location with respect to the hot water dispenser assembly 11, there is affixed a rack 42 wherewith a pinion 41 cooperates which is keyed to that portion of the trunnion 34 which extends outwards from said wall 32. In particular, the pinion 41 has twice the number of teeth on the rack 42. The pinion 41 and rack 42 constitute a tilting device for the percolator 30, as explained hereinafter.

On the section included between the rack 42 and the metering dispenser assembly 10, the walls 32 and 33 are provided with respective horizontal fins 43 and 44 extending at right angles toward one another.

The annular rim 31 of the cup-like percolator 30 is arranged to bear on these fins 43 and 44, in order to prevent the percolator from being tilted over incidentally during its movements in the section extending below the dispenser assemblies 10,11.

Generally indicated at 12 is a device for emptying the cup-like percolator 30. This emptying device comprises a lever 47 carried pivotally on the body 4. The lever 47 has an actuation arm 48 extending toward the wall 37 externally thereof and being adapted to be pushed, as explained hereinafter, by a rod 51 attached to the trunnion 35 of the cup-like percolator 30. The lever 47 further includes a striker arm 49 which is driven with a substantially hammering motion at a location intermediate to the walls 32 and 33. A spring 50 holds the arm 49 elastically above said walls 32 and 33.

Preparation of an "espresso" coffee on an apparatus as hereinabove described takes place as follows.

Through the handgrip 39, the cup-like percolator 30 is moved along the guiding slots 36 and 37 to a first position below the coffee powder metering dispenser assembly 10. Thereupon the linkage 18 of said assembly is actuated and a metered amount of powder coffee is caused to fall into the percolator 30. It should be noted that during this movement the percolator cannot be tilted over about the trunnions 34 and 35 because it is retained in position as by its annular rim 31 bearing on the fins 43 and 44 bent at right angles. The cup-like percolator 30 is then taken to below the hot water dispenser assembly 11. A stop (not shown) ensures this exact positioning of the cup-like percolator. Hot water is then admitted under pressure into the cylinder 20. The water thus fed in first moves the piston 21 down, and the pad 23 compresses the powder coffee in the cuplike percolator 30. On reaching a certain pressure level of the water within the cylinder 20, the check valve 26 is opened, and the water is delivered through the multiple perforations 24. Thus, there occurs a traditional percolation of the hot water through the powder coffee. The issuing coffee is collected in the collector 27 and is delivered whence through the spouts 28 into cups C intentionally placed preliminarily on the base 2.

In order to empty the cup-like percolator 30 of its coffee grounds, said cup-like percolator is shifted along the guide slots 36 and 37 toward the device 12. During this movement, the pinion 41 will mesh with the rack 42 and cause the percolator 30 to be tilted over. The above movement is continued until the rod 51 of the trunnion 35 of the cup-like percolator 30 strikes and pushes the actuation arm 48 of the lever 47. As a result, the arm 49 of said lever 47 is shifted angularly downwards (with a hammering motion) against the bias of the spring 50, to strike the bottom cap 40 of the cup-like percolator 30. Said bottom cap 40 is shifted inside the cup-like percolator 30 downwards until it strikes the rim 46 of the percolator, with consequent separation of the coffee grounds which will fall into a collecting vessel 55. On returning the cup-like percolator 30 toward the metering dispenser assembly 10, this will return to its original position and the lever 47 moved back to its original position by the spring 50.

In FIGS. 7,8 and 9, there is shown a modified embodiment of the hot water dispenser assembly. According to this variation, a dispenser assembly 57 comprises a boiler body 58 guided movably along two upright shanks 59 (only one of which is visible in FIG. 9) in the case 2 by means of two slides 60 and 61. The boiler body 58 is driven through a handle lever 62 supported pivotally on the shanks 59 and having a pair of identical camming profiles 62a in contact engagement with respective feeler pegs 63, rigid with the boiler body 58. Springs 64, mounted on the shanks 59 and being compressed between the slide 60 and ledges 64a on the shanks 59, urge the boiler body 58 elastically upwards, with the feeler pegs 63 abutting the respective cam profiles 62a. The cam profiles 62a have respective travel limit recesses 62b.

In the boiler body 58, an electric resistance heater 65 heats the water as admitted from a conventional supply line, not shown; the boiler body 58 has a cylindrical configuration and is closed downwardly by a piston 66 guided vertically for a sealed sliding movement in the body 58 between a re-entered position and a downward extended position. An annular ledge 65a is formed at the bottom of the boiler body 58 for tight engagement, through a gasket 66a, with the rim of the cup-like percolator 30.

The piston 66 is driven downwards, to the extended position thereof, by the hot water and steam pressure within the boiler body 58, against the bias of a spring 67 fitted over a shank 68 and compressed between a ledge 69 on the shank and a ledge 70 on a tube 71 rigid with the boiler body 58, whereinto the shank 68 is inserted; in its downward movement, the piston partway penetrates the percolator 30 and compresses the coffee powder contained therein.

Through the piston 66, there is formed a passage 72 for delivering the hot water, which is cut off removably by a least-pressure valve 71 which opens automatically on reaching a minimum pressure setting in the boiler body 58. In the lower portion of the piston 66, a perforated washer 73 ensures that the hot water is sprinkled over the coffee powder in the percolator 5.

On lowering the lever 62, the body 54 is moved down onto the cup-like percolator 30; at the end of the lowering movement, the lever 62 will be held down by the feeler pegs 63 engaging in the travel limit recesses 62b in the cam profiles 62a. In this condition, a hydraulic seal is formed between the boiler body 58 and cup-like percolator 30, since the rim 31 of said percolator 30 is received in the annular ledge 65a against the gasket 66a.

While the lever 62 is being lowered, a microswitch (quite conventional and not shown) will control the delivery of water into the boiler body 54, where the water will be heated by the electric resistance heater 65.

As the water pressure increases, the piston 66 is pushed down into the cup-like percolator 30 and compresses the coffee powder contained therein. On reaching a set water pressure, the valve 71 opens and the water is dispensed through the perforated washer 73. There occurs then the traditional percolation of the water through the coffee powder.

I claim:

1. Apparatus for preparing "espresso" coffee in a household environment comprising:
   a load bearing frame defining a base;

a powder coffee metering dispenser assembly carried on said frame at a position overlying said base;

a hot water dispenser assembly carried on said frame at a position flanking the metering dispenser assembly and overlying said base;

guide forming means supported and extending at a position underlying said dispenser assemblies and overlying said base;

a cup-like percolator having guide forming means; and an emptying device for the cup-like percolator supported on said frame at a position adjacent to said guide forming means wherein said hot water dispenser assembly comprises an upright cylinder supplied with hot water under pressure, a piston slidable within the cylinder and having a rod extending axially in said cylinder and having a free end externally thereof, a pad attached to the free end of said rod, a plurality of holes through said pad for the sprinkle delivery of hot water, a conduit for supplying hot water to said holes, formed axially through said rod and said piston, and a calibrated check valve mounted in said conduit.

2. Apparatus according to claim 1, characterized in that it further comprises a tilting mechanism for the cup-like percolator supported on said frame intermediate to said hot water dispenser assembly and said percolator emptying device.

3. Apparatus according to claim 2, characterized in that said tilting mechanism comprises a pinion rigid with said cup-like percolator and a stationary rack rigid with said case, said pinion having twice the number of teeth as said rack.

4. Apparatus according to claim 3 characterized in that said emptying device for the cup-like percolator comprises a lever having an actuating arm driven by a rod rigid with said cup-like percolator and a striker arm moveable with substantially hammering motion on said tilted over cup-like percolator.

5. Apparatus according to claim 1, characterized in that said hot water dispenser assembly comprises vertically disposed guides on said frame, a boiler body guided slidably vertically on said guides to and from said cup-like percolator;

a piston guided slidably and sealingly axially in said boiler body and driven from a reentered position to a downwardly extended position by the water pressure in the boiler body against the bias of spring-loaded means; and a water delivery passage extending through said piston and having a least-pressure valve therein.

* * * * *